Aug. 25, 1959 R. H. MORGAN 2,901,539

SYSTEM FOR THE AUTOMATIC ADAPTATION OF TELEVISION CAMERA APPARATUS TO VARYING LIGHT INTENSITY LEVELS

Filed April 20, 1956 2 Sheets-Sheet 1

INVENTOR

RUSSELL H. MORGAN

BY Nelson H. Shapiro

ATTORNEY

Aug. 25, 1959 R. H. MORGAN 2,901,539

SYSTEM FOR THE AUTOMATIC ADAPTATION OF TELEVISION CAMERA APPARATUS TO VARYING LIGHT INTENSITY LEVELS

Filed April 20, 1956 2 Sheets-Sheet 2

INVENTOR

RUSSELL H. MORGAN

BY Nelson H. Shapiro

ATTORNEY

United States Patent Office 2,901,539

Patented Aug. 25, 1959

2,901,539

SYSTEM FOR THE AUTOMATIC ADAPTATION OF TELEVISION CAMERA APPARATUS TO VARYING LIGHT INTENSITY LEVELS

Russell H. Morgan, Baltimore, Md.

Application April 20, 1956, Serial No. 579,543

17 Claims. (Cl. 178—7.2)

This invention relates to the control of television camera apparatus and more particularly to the automatic control of such apparatus in response to varying light or other radiation intensity levels.

Television cameras, whether employed for indoor or outdoor programming, are required to operate under varying light intensity conditions. The variation in light intensity levels may be gradual, as where a baseball game is televised under conditions of gradually diminishing daylight, or may be sudden as where the sun suddenly passes behind a cloud or a flash of light is produced for a stage effect, for example. It is readily apparent that the manual control of television camera apparatus to compensate for and adapt to such light changes is undesirable both because of inconvenience and the inability to cope with rapidly varying conditions. Consequently, diverse attempts have been made in the prior art to provide for the automatic adaptation of the camera tube system. The automatic controls utilized heretofore are at best only partly effective and are principally deficient in that they are operative over a very narrow range of light levels. By far the majority of such devices are of the feed back type, that is, a voltage obtained at or near the output of the system is fed back to adjust the system. Manifestly, any feedback system is characterized by the fact that there must be a variation in the output before any control potential can be obtained.

Modern television transmitting equipment utilizes camera tubes of the electron beam scanning type almost exclusively. Such tubes are exemplified by the image orthicon or the vidicon and are characterized by the production of a charge image which is swept or scanned by an electron beam. Unfortunately, camera tubes of the electron beam scanning type are not well adapted to control systems of the feedback type. A principal reason for this is that the operation of the control system is influenced to a large degree by the beam current of the camera tube. For example, if the control system operates upon the gain of the video amplifier connected to the output of the camera tube, when the camera tube's beam is first turned on, the gain of the amplifier is at a maximum. As the beam current is adjusted to its operating level, the automatic gain control experiences a state of instability until the camera tube's signal and the tube's electron beam are adjusted to a steady value. If the electron beam is adjusted to a somewhat critical level, as is usually standard practice, an increase in the level of the light incident on the tube makes the automatic gain control inoperative until the camera tube's electron beam is readjusted. Thus, the operation of the automatic gain control is dependent at all times upon the correct setting of the electron beam intensity.

It is a principal object of the present invention to overcome the defects of the prior art control systems.

A more specific object of the invention is to provide an automatic apparatus for the adaptation of television systems to varying light intensity levels.

Another object of the invention is to provide a system for varying the gain of the video amplifier of television apparatus in inverse proportion of the intensity of the light incident upon the television camera.

A further object of the invention is to provide a system for controlling the beam current of the camera tube automatically in accordance with the level of the light incident upon the tube.

An additional object of the invention is to provide a control system of the aforesaid type which is operative over a very wide range of light levels.

Yet another object of the invention is to provide a system for controlling the beam current of a television camera tube and the gain of a video amplifier concurrently.

A still further object of the invention is to provide an automatic gain control for television camera apparatus which is independent of the level of the signals at the output of the video amplifier.

An additional object of the invention is to provide a system for controlling the beam current of a camera tube, such as an image orthicon or vidicon, independently of the beam current itself.

Another object of the invention is to provide a control system of the aforesaid type including a light sensitive control tube, the output of which feeds both the beam current and gain control circuits as well as a device for controlling the intensity of the light incident upon the television camera tube and the control tube.

Yet another object of the invention is to provide a system which produces a control potential which varies logarithmically with the light intensity.

These and other objects of the invention will become more readily apparent in the following detailed description of the invention taken in conjunction with the accompanying drawings wherein.

Briefly, the control system of the present invention is intended principally for use in conjunction with a television camera tube of the electron beam scanning type and a cascade video amplifier which receives the output signals from the camera tube. A light sensitive control tube is subjected to light from the same scene as light incident upon the camera tube and is arranged to produce, through the use of suitable circuitry, an output potential which varies logarithmically with the incident light. This potential is employed for three control functions in a complete system. The first control function contemplates the variation of the light incident upon the camera tube and control tube, within predetermined limits. The second control function contemplates the variation of the gain of the video amplifier over a wide range inversely with respect to the incident light. The third control function contemplates the variation of the beam current of the camera tube to maintain the proper beam current as the light intensity varies.

Figure 1:
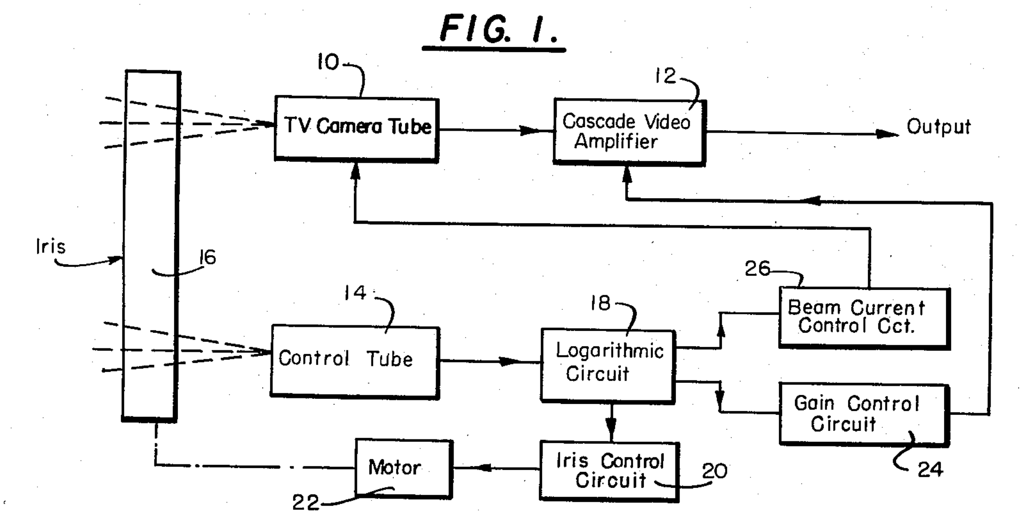
Figure 1 is a block diagram of a preferred embodiment of a complete control system in accordance with the invention.

Before discussing the details of the invention and the theory by which the invention operates, the overall system of the invention will be described. Referring to Figure 1, a television camera tube 10, which is preferably a vidicon, an image orthicon, or other electron beam scanning type, is arranged to receive light from a scene to be transmitted, as indicated by the dash lines. In practice, a suitable optical system (not shown) will precede the television camera tube. The output signals of the camera tube are fed to a conventional cascade video amplifier 12. This amplifier may include a series of individual pentode or cascoded triode amplifier stages arranged in cascade in accordance with the usual practices. The output signals from the video amplifier are fed through the conventional television transmitter circuits and are ultimately transmitted to a television receiver by virtue of a transmission line or a transmitting antenna.

A light sensitive control tube 14, which, in a preferred embodiment is constituted by a photomultiplier tube, is arranged to receive light from the scene on which the camera tube is focused. A second optical system (not shown) will normally precede the control tube. The amount of incident light at the television camera tube and the control tube is preferably controlled by a light valve device 16, which, for simplicity has been designated an iris. The output of control tube 14 is fed to a circuit 18 which produces a potential varying logarithmically with the light incident upon the control tube. Logarithmic circuit 18 feeds an iris control circuit 20 which varies the amount of light passed by iris 16 through the control of a motor 22 mechanically coupled to the iris, as indicated by the dot-dash line. Logarithmic circuit 18 also feeds a gain control circuit 24 which controls the gain of video amplifier 12 inversely with respect to the light incident upon the control tube. In addition, the logarithmic circuit 18 feeds a beam current control circuit 26 which determines the beam current of the television camera tube 10.

Figure 2:
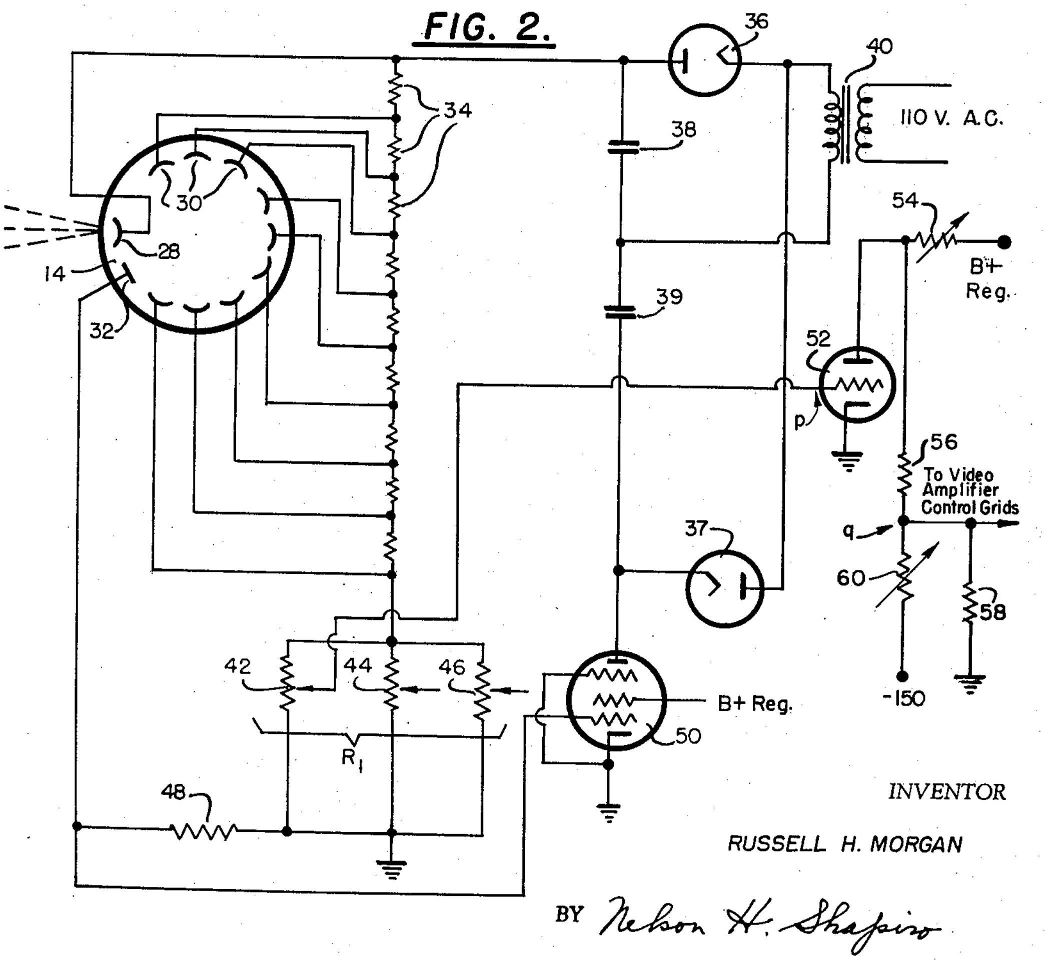
Figure 2 is a circuit diagram of a preferred embodiment of the light sensitive control tube circuit and automatic gain control circuit of the invention.

Figure 2 illustrates the circuits of blocks 14, 18, and 24 in greater detail. The photo control tube 14, which may be of the type 931–A, for example, includes a photo cathode 28, a plurality of dynodes 30, and an anode or collector 32. The cathode 28 is exposed to the light from the scene to be televised and is connected to the top of a voltage divider chain comprising resistors 34. The resistor junctions are connected, respectively, to the dynodes as indicated. The cathode 28 and the top of the voltage divider are connected to the negative side of a power supply, which may include a pair of rectifiers 36, 37, condensers 38, 39, and a power transformer 40 connected in a conventional voltage doubler arrangement. The last resistor $R_1$ in the voltage divider chain for the purposes of this invention is constituted by three potentiometers in parallel respectively 42, 44, and 46, one end of each resistor being connected to ground as indicated. The anode or collector 32 of the photomultiplier tube is connected to ground through a load resistor 48 and is also connected to the control grid of a pentode 50. The screen grid and the suppressor of pentode 50 are connected, respectively, to a source of regulated B+ and to the cathode, as indicated, while the anode of pentode 50 is connected to the junction of rectifier 37 and condenser 39, so as to complete the circuit for the power supply of the photomultiplier tube across the voltage divider chain. The circuit of Figure 2 thus far described does not per se constitute the present invention, such circuits being known in the prior art. The output of such a circuit across resistor $R_1$ varies logarithmically with the intensity of the light incident upon the cathode of the photomultiplier tube, and it is this property of the circuit which is utilized in the present invention. It will be appreciated as the description of the invention proceeds, that other circuits producing an output which varies logarithmically with light intensity may be employed for the purposes of the present invention.

The amplitude of the output signal of a television system is proportional to the intensity of the incident light, I, and the gain of the television amplifier, G; that is, $$S=kIG$$

where S is the amplitude of the output signal of the television system, and $k$ is a constant.

If the signal amplitude is to be maintained constant with varying light conditions, it is clear from this equation that the gain of the amplifier must be made inversely proportional to the intensity of the incident light; that is, $$G=K/I$$

where K is a constant.

The relationship between the light intensity I and the potential across the last resistor $R_1$ in the voltage divider chain of Fig. 2 is given closely by the equation $$E= -E_0-a \log cI) \quad (1)$$

where $E_0$ is a constant (approximately 100 volts for a power supply of 1000 volts and where $R_1$ has the same value as the other resistors 34), $a$ is a constant (approximately 20 volts for many photomultiplier tubes), and $c$ is a constant (which varies with the value of resistor 48, the sensitivity of the phototube, and the amplification factor of pentode 50).

Also, the gain of a cascade amplifier of $n$ similar stages is given by the equation $$G=(g_m R_L)n \quad (2)$$

where $g_m$ is the mutual conductance of each amplifier tube, and $R_L$ is the load resistance of each tube, if $R_L$ is very much less than $r_p$ (the plate resistance of each tube) as is standard practice in TV amplifiers.

Over a limited range of grid voltage most amplifier tubes exhibit a $g_m$ which varies approximately logarithmically with the tube's grid potential, that is, $$\log g_m=bE_c+E_a \quad (3)$$

where $E_c$ is the applied grid potential, $b$ is a constant (0.11 for a 6BQ7–A in cascode), and $E_a$ is a constant whose value depends on the type of amplifier tube and its initial grid bias.

Combining Equations 2 and 3:

$$\log G=n \log R_L+nbE_c+nE_a \quad (4)$$

Now if a fraction $d$ of the potential E appearing across resistor $R_1$ in Figure 2 is amplified by a factor $m$, and in the process is reversed in polarity, and if the resulting potential is applied to the grid circuits of an amplifier of $n$ stages in such a manner that the grid potential is made to vary with the light incident on the phototube, then from Equation 4

$$\log G=n \log R_L-nmbdE+nE_a \quad (5)$$

Combining Equations 1 and 5:

$$\log G=n \log R_L+nmbdE_0+nE_a-nmabd \log I_c \quad (6)$$

Therefore, if $nmabd$ can be made equal to 1, $$G=K/I \quad (7)$$

where log K is a constant equal to $$n \log R_L+nmbdE_0+nE_a-nmabd \log c$$

Thus, G is inversely proportional to I.

The range over which the proportionality exists is a function of the range over which the mutual conductance of a single tube is a logarithmic function of the tube's grid voltage and of the number of stages. From Equation 4, the log range of proportionality is clearly $nbE'_c$, where $E'_c$ is the range of log $g_m$ versus $E_c$ proportionality for a single tube. For an eight stage amplifier using 6BQ7A tubes, where $E'_c$ is approximately equal to 4.5 volts and $b$ is approximately equal to 0.11, the log range of proportionality equals $nbE'_c=8\times0.11\times4.5=4$. This means a proportionality range of 10,000 times I.

The requirement that *nmbda* must equal 1 can be achieved in practice. If, for example, the controlling voltage is applied to the grids of an eight stage amplifier ($n=8$) and $b=0.11$ (for 6BQ7A tubes), and if $a=20$ as indicated above, then if a fraction $d$ of the potential appearing across resistor $R_1$ in Figure 2 is amplified by a factor $m$, and is applied after reversal of polarity to the grids of the amplifier whose gain is to be controlled inversely with the prevailing light intensity, the desired result is obtained. A preferred embodiment for achieving this result is illustrated in Figure 2. This circuit which constitutes block 24 in Figure 1 comprises a triode 52 with its anode connected to a source of regulated B+ through a variable load resistor 54, its cathode grounded, and its control grid connected to the variable tap of potentiometer 42, which forms a part of resistor $R_1$. The output circuit of triode 52 includes the variable load resistor 54 and the resistor network 56, 58, 60. One end of each of the resistors 56, 58, and 60 is connected to a common point "*q*." The other end of resistor 56 is connected to the plate of amplifier 52, the other end of resistor 60 is connected to a source of negative potential as indicated; and the other end of resistor 58 is connected to ground. The junction point "*q*" is also connected to the grids of the video amplifier tubes, the gain of which is to be controlled, through the usual grid return resistors.

The amplification of signals impressed at point "*p*" of amplifier 52 and appearing in the output circuit at point "*q*" is controlled by variable resistor 54. The initial D.C. bias applied to the grids of the video amplifier tubes (2 or 3 volts) is controlled by variable resistor 60. In practice resistors 56 and 60 are large compared to resistors 54 and 58. This arrangement does not alter the amplification of the system significantly as the D.C. grid bias is adjusted, nor alter the D.C. bias of the video grids significantly as the amplification of amplifier 52 is adjusted. The amplification between points "*p*" and "*q*" in Figure 2 is made equal to minus *m* (controlled by variable resistor 54), and if the portion of the potential across resistor $R_1$ at the tap of resistor 42 is equal to *d*, such that *dm* equals $1/nba$, the desired result of control of video amplifier gain inversely with the light intensity is achieved.

In a television transmitting system of the type described above, the presence of a variable light intensity level requires not only an adjustment of the system amplifier gain, which is achieved automatically in accordance with the invention, as set forth above, but also requires an adjustment of the beam current in the camera tube. The beam current of this tube is usually adjusted to prevailing light conditions by varying the tube's control grid potential. For proper operating conditions, the relationship between the intensity of the light incident on the camera tube and the potential of the control grid of the tube is given to sufficiently close approximation by the equation $$\log I=rE_g+E_b \tag{8}$$

where $E_g$ is the applied control grid potential, $r$ is a constant, and $E_b$ is a constant.

Since the circuit described above provides a potential which varies logarithmically with the incident light intensity, this potential may be employed, after the application of suitable circuitry to resolve the differences of the constants of Equations 1 to 8, to adjust automatically the beam current of the camera tube as the intensity of the prevailing light varies. Equation 1 may be written in the form $$\log I=\frac{E}{a}+A \tag{9}$$

where $$A \text{ equals a constant}=\frac{E_0}{a}-\log c$$

Combining Equations 8 and 9

$$\frac{E}{a}+A=rE_g+E_b \tag{10}$$

Differentiating Equation 10 with respect to E, the rate of change of $E_g$ with change of E to ensure automatic following of $E_g$ with variations in light intensity is given by the equation $$\frac{\Delta E_g}{\Delta E}=\frac{1}{ar} \tag{11}$$

Figure 3:
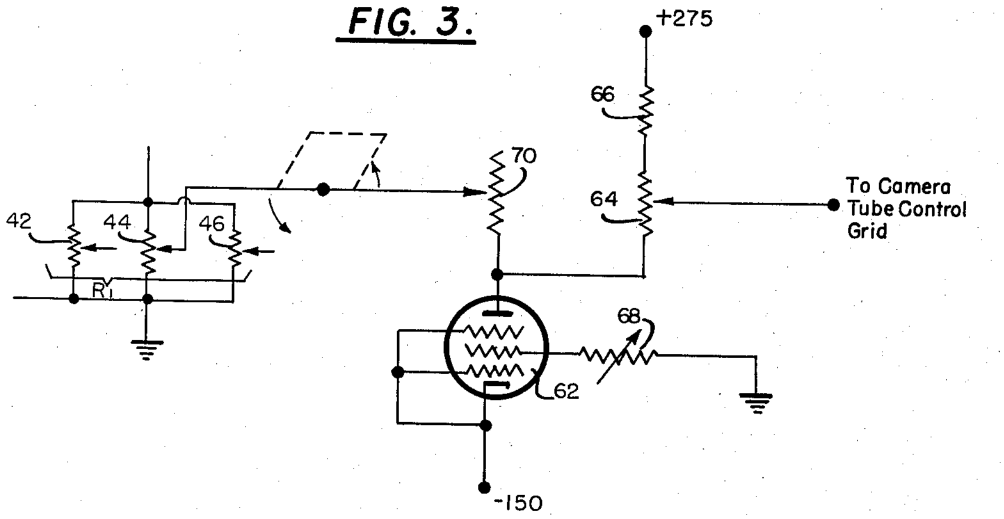
Figure 3 is a circuit diagram of a preferred embodiment of a beam current control of the invention.

As an example, $a$ may be approximately equal to 20 and $r$ may be approximately 0.1. Hence, Equation 11 indicates that $E_g$ should in this instance vary by an amount approximately one-half that of E. The circuit of Figure 3 illustrates one manner in which $$\frac{\Delta E_g}{\Delta E}$$

may be controlled over a wide range to provide the necessary control voltage for a particular camera tube's grid. This circuit, in a preferred embodiment, comprises a pentode constant current tube 62, the cathode of which may be connected to a source of negative supply and the anode to a source of positive supply through a potentiometer 64 and an isolating resistor 66. The tap of potentiometer 64 is connected to the control grid of the camera tube. A variable resistor 70 is also connected to the plate of pentode 62, and the tap of resistor 70 is connected to the tap of potentiometer 44 and ganged thereto as indicated. Potentiometer 44 constitutes a portion of resistor $R_1$, shown in Figure 2. The arrangement is such that the tap of resistor 70 moves away from the plate of pentode 62 as the tap of potentiometer 44 approaches the ground potential at the same rate. Also, in practice, potentiometer 44, variable resistor 70 and potentiometer 64 are made a small fraction (each less than 10%) of resistor 66.

The screen grid of the pentode may be connected through a variable dropping resistor 68 to ground, while the control grid and suppressor grid may be connected to the cathode as indicated.

Resistor 70 is in series with pentode 62, a constant current tube, and hence the plate current of the pentode is essentially independent of the setting of potentiometer 44 and resistor 70. Since the impedance between the plate of the pentode and the B+ supply is very much greater than the impedance between the plate and ground, the tap to the B+ supply may be ignored and all of the current to the negative supply at the cathode of the pentode may be considered as flowing from ground. Furthermore, if the current of pentode 62, as adjusted by resistor 68, is a small fraction (less than 10%) of the total current flowing through potentiometer 44, the potential across $R_1$ is not significantly affected by the setting of the tap of potentiometer 44. Hence, in the absence of variation in light intensity, the current through potentiometer 44 is constant, and the potential at the plate of pentode 62 with respect to ground is determined by the settings of the tap of potentiometer 44 and resistor 70. Now, if the ratio of the total impedance of resistor 70 to the total impedance of potentiometer 44 is made inversely proportional to the ratio of the current through the respective impedances, the plate potential will remain constant regardless of the settings of potentiometer 44 and resistor 70, provided that the taps are varied to increase the impedance to ground of one tap and to decrease the impedance to ground of the other tap at the same rate; that is, at a given light intensity, the potential at the plate of pentode 62 (and the control grid of the camera tube) is independent of the setting of the control of 44, 70. However, with variation in light intensity, the potential at the plate of pentode 62 is markedly influenced by the setting of the control 44, 70. Indeed, it may be made to vary between 0 and ΔE (Equation 11), depending on the setting of the ganged taps.

Thus, the portion of $\Delta E$ available at the plate of the pentode to control the grid of the camera tube of the television system can be varied from zero to one to meet the condition of Equation 11 for automatic control of the grid voltage of a particular camera tube. In practice, the control of 44, 70 is adjusted to meet the requirements of Equation 11. Since resistor 66 is large compared to potentiometer 64, the potential available from the control of 64 for direct application to the camera tube's control grid will be such that essentially $$\frac{\Delta E_g}{\Delta E}=\frac{1}{ar}$$

under this condition. Control of 64 permits the correct value of $E_g$ for optimum operating conditions for the camera tube. With the arrangement shown, adjustments of 44, 70 may be made without disturbing the setting of potentiometer 64 and vice versa.

Figure 4:
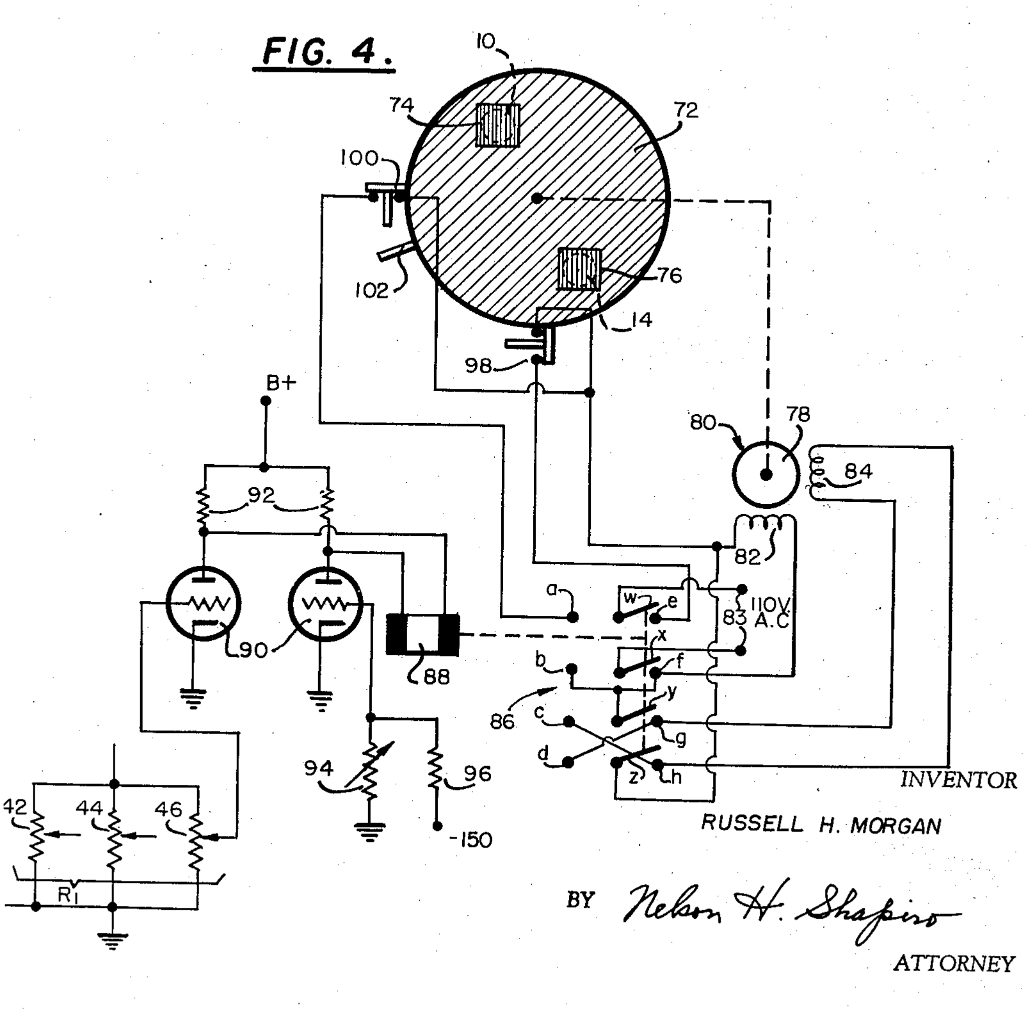
Figure 4 is a circuit diagram of a light valve system in accordance with the invention for controlling the intensity of the light incident upon the television camera tube and control tube, the light valve structure per se being illustrated diagrammatically in this figure.

The circuits described in the foregoing paragraphs provide for (*a*) the automatic control of television amplifier gain in a television camera system when the prevailing lighting conditions change through a wide range and (*b*) the automatic control of the beam current of the camera tube during similarly changing lighting conditions. These circuits solve the major control problems of television systems in so far as varying light conditions are concerned. They may be considered analogous to the operation of the automatic physiologic systems of the human eye, which cause the eye to adapt readily to variable light levels. In addition to this control the human eye has an automatic pupil which acts as a light valve to control the light incident upon the retina. An analogous control for television systems is illustrated in Figure 4.

The light valve employed in the system of the present invention may be constituted by a conventional variable aperture device, but in a preferred form is constituted by cooperating light polarizing elements. The light valve per se comprises a rotatable disc 72 composed of material which transmits light polarized in one direction, and a pair of stationary elements 74, 76 composed of material which passes light polarized in one direction. Elements 74 and 76 have the same axis of polarization and are centered on a diameter of disc 72. It will be apparent that by rotating disc 72 the polarization of disc 72 with respect to elements 74 and 76 will be varied, and the amount of light polarized essentially in one direction which is passed successively by the disc and elements 74 and 76 will vary accordingly. The disc is preferably arranged so that it rotates between two extreme angular positions which differ by less than 90 degrees. In one of these positions the directions of polarization of the disc and elements 74 and 76 are the same so that a maximum amount of light is transmitted, while in the other position the directions of polarization are almost orthogonal, and the light transmitted is close to the zero level.

Aligned, respectively, with polarizing elements 74 and 76 are the light sensitive elements of the camera tube 10 and the control tube 14. As indicated previously, suitable optical systems (not shown) are provided to direct light to the control tube and the camera tube.

Disc 72 may be driven by the rotor 78 of an induction motor 80, which may be a split phase or capacitor type, having a pair of orthogonal field windings 82, 84. These windings are arranged to be energized from a source of A.C. at terminals 83 through a four pole double throw switch 86. Switch 86 may be operated by the coil of a relay 88. Relay 88 is preferably of the differential type having a pair of opposite closed positions and an intermediate neutral or open position. The relay requires an energizing potential exceeding a certain threshold of a first polarity to close to its first position, and an energizing potential exceeding a threshold of the opposite polarity to close to its other position. The relay will remain closed until the energizing potential falls to a level substantially less than the closing threshold value, at which time it will open to its neutral position.

The coil of relay 88 may be energized from a differential amplifier which, in the form shown, comprises a pair of triodes 90 connected in parallel between a B supply and ground. If, as in the form illustrated, the output is taken from the plates of triodes 90, a pair of plate load resistors 92 is utilized. The control grid of one of the triodes is connected to the variable tap on potentiometer 46 (previously described in connection with Figure 2), while the control grid of the other triode is connected to a variable bias supply, which may include a variable resistor 94 connected to ground, and a source of negative supply connected to the junction of resistor 94 and the control grid through a resistor 96.

Switch 86 has a first set of contacts *a, b, c, d,* second set of contacts *e, f, g, h,* and switch blades *w, x, y, z.* Blades *w, x* are connected to terminals 83. With the blades in their neutral position, the A.C. supply is disconnected from the motor. With the blades closed on contacts *a, b, c, d,* the A.C. supply is connected to field winding 82 through blade *w,* contact *a,* a limit switch 100, contact *f,* contact *b,* and blade *x.* The A.C. supply is connected to winding 84 by virtue of the connection of blade *y* to contacts *b* and *f* and one side of winding 82, and the connection of blade *z* to the other side of winding 82. With the blades closed on contacts *e, f, g, h,* the energization circuit is completed through a second limit switch 98. It will be noted, however, that the connection of winding 84 to blades *y* and *z* is reversed, so that the phase relationship between the field windings is reversed. Limit switches 98 and 100 are normally closed and are opened by engagement of a stop 102 fixed to the disc 72.

In the operation of the apparatus of Figure 4, with switch 86 in its neutral position, the energization circuit of field winding 82 is interrupted, and the motor and disc 72 are at rest. If the light incident upon the photomultiplier tube 14 varies, the potential at the tap of potentiometer 46 in the voltage divider chain of the photomultiplier tube also varies, and if the change is sufficient, the output of the differential amplifier will increase to one of the threshold levels of relay 88, and switch 86 will close at one of its sets of contacts. Motor 80 will be energized and will cause disc 72 to rotate in a direction which will change the light incident upon the photomultiplier tube 14 so as to compensate for the change in the prevailing light level. Rotation of disc 72 will, of course, change the level of the light incident upon the camera tube 10 as well.

As the variation in the prevailing light level is compensated, the output of the differential amplifier will decrease substantially below the aforesaid threshold level until a point is reached at which switch 86 is returned to its neutral position. At this point the motor will no longer be energized and the disc will cease to rotate. Variation of the prevailing light level in the opposite direction will be compensated by the closing of switch 86 on its other set of contacts so as to rotate disc 72 in the opposite sense.

If the change in the prevailing light level is so extreme that the disc is rotated to one of its limiting positions, stop 102 will open one of the switches 98, 100 (that is, that limit switch connected to the set of contacts of switch 86 on which the switch arms are closed) and the opening of the limit switch will deenergize the motor 80. If the light level should change in the opposite direction to the point where switch 86 is closed on its other set of contacts, the motor 80 will be energized to rotate in the opposite sense, and the fact that the last-mentioned limited limit switch is open will have no effect. This limit switch will, of course reclose as the stop 102 moves away. Bias resistor 94 is adjusted so that the disc 72 restores the light intensity incident on the light sensitive tubes to a level determined by the setting of potentiometer 46.

In the operation of the complete system of Figure 1, within its limits the iris or light valve 16 will maintain the light incident on the camera tube and the control tube substantially constant. The mechanical system of the iris is relatively slow acting, however, and any fast variations in the light level will be compensated by the gain control circuit 24. The gain control circuit will also compensate for light level variations which are insufficient to cause energization of the motor 22, and in addition will control the system when the iris reaches one of its limiting positions. Beam current control circuit 26 will operate simultaneously with the gain control to maintain the proper beam current of the camera tube.

While a complete television system may require each of the control functions described above, it will be appreciated by those skilled in the art that the control functions described may be utilized individually, where such use is deemed desirable. It should be noted, however, that the system of the present invention provides a high degree of integration of the three control functions. While what are now believed to be preferred embodiments of the invention have been illustrated and described, it will be understood by those skilled in the art that many modifications and changes in these embodiments may be made without departing from the principles and spirit of the invention. For example, it is contemplated that transistor circuits may be employed in place of vacuum tube circuits. The embodiments shown and described are, therefore, to be considered exemplary rather than restrictive of the invention, the scope of which is defined in the appended claims, and those modifications which fall within the meaning and range of equivalency of the claims form a part of the present invention.

What I claim as my invention is:

1. In a system of the type described, including a radiation-sensitive camera device of the type employing an electron beam, and a cascade amplifier receiving signals from the output of said camera device; a radiation-sensitive control device, said camera device and said control device being adapted for exposure to radiation from a common subject, means coupled to said control device for producing an electric signal which varies logarithmically with respect to the intensity of said radiation, means coupled to said signal producing means for controlling the gain of said amplifier in accordance with said signal, means coupled to said signal producing means for controlling the intensity of said electron beam in accordance with said signal, and means responsive to the radiation incident on said control device for controlling the intensity of the radiation incident on said camera tube and said control device.

2. An automatic beam current control system for a cathode ray radiation-sensitive tube, comprising means independent of said tube and responsive to the prevailing radiation level to which said tube is subjected for producing a control signal which varies logarithmically with said radiation level, and means for controlling the beam current of said tube in accordance with said signal.

3. An automatic wide range gain control system for an amplifier of the type including individual stages, the transconductance of which varies logarithmically with a bias level, comprising means independent of said amplifier for producing a control signal which varies logarithmically with the level of intelligence to be translated by said amplifier, and means for controlling said bias level in accordance with said control signal.

4. An automatic gain control system for a cascade amplifier fed from a radiation-sensitive camera device, comprising a radiation-sensitive control device arranged for exposure to radiation from the subject from which radiation is incident upon said camera device, means coupled to said control device for producing a signal which varies logarithmically with said incident radiation, and means for controlling the gain of said amplifier in accordance with said signal.

5. An automatic gain control system for a cascade amplifier, the input signal of which is responsive to the intensity I of prevailing radiation, comprising means for producing a control potential E substantially in accordance with the relationship $E=-(E_0-a \log cI)$, where $E_0$, $a$, and $c$, are constants, and means for controlling the bias of the individual stages of said amplifier in accordance with a potential $-md$E derived from said potential E such that $nmabd=1$, where $n$ is the number of stages and $m$ and $d$ are variables and $b$ is a constant.

6. In a system of the type including a radiation-sensitive detector device and an amplifier fed therefrom, said amplifier having $n$ stages of similar vacuum tubes each having a transconductance $g_m$ such that $\log g_m=bE_c+E_a$, where $b$ is a constant, $E_c$ is the applied bias potential, and $E_a$ is a constant, and said amplifier having an overall gain $G=(g_mR_L)^n$, where $R_L$ is the load resistance of said stages; an automatic volume control comprising a radiation-sensitive control device responsive to the intensity I of the radiation incident on said detector device and said control device, means responsive to the output of said control device for producing an output potential $E=-(E_0-a \log cI)$, where $E_0$, $a$, and $c$ are constants, and means responsive to said potential E for applying a potential $-md$E to gain control elements of said amplifier, such that $nmabd=1$, where $m$ and $d$ are variables, whereby the gain $$G=\frac{K}{I}$$

where K is a constant.

7. An automatic gain control for an amplifier, the input signal of which is responsive to the intensity of prevailing radiation, comprising means for producing a potential which varies logarithmically with said intensity, and means for amplifying and inverting at least a portion of said potential for application to gain control means of said amplifier.

8. An automatic beam current control for a radiation-sensitive detector tube of the electron beam scanning type in which it is desired to vary the control grid potential $E_g$ in accordance with the relationship $\log I=rE_g+E_b$, where I is the radiation intensity and $r$ and $E_b$ are constants, comprising means responsive to the radiation intensity for producing a potential E such that $$\log I=\frac{E}{a}+A$$

where $a$ and A are constants, and means for varying the control grid potential in accordance with the relationship $$\frac{\Delta E_g}{\Delta E}=\frac{1}{ar}$$

where $\Delta E_g$ and $\Delta E$ are the change of the control grid potential and produced potential, respectively.

9. A control system for television apparatus of the type including a light-sensitive camera device and an amplifier fed therefrom having an overall gain proportional to the number of stages therein and to the transconductance of the stages, comprising means including a photomultiplier tube for producing a potential which varies logarithmically with the intensity of the light to which said camera device and tube are subjected, and means for deriving a gain control bias from said potential for varying the gain of said amplifier inversely with said light intensity.

10. A control system in accordance with claim 9, said photomultiplier tube having a plurality of dynodes connected to the taps on a voltage divider, and said potential being produced across a portion of said voltage divider, said gain control bias deriving means comprising an amplifier the input of which is coupled to said voltage divider and the output of which is coupled to the first-mentioned amplifier.

11. A control system in accordance with claim 10, the second-mentioned amplifier including means for setting the initial gain of the first-mentioned amplifier.

12. A control system for a radiation-sensitive cathode ray tube, comprising means for producing a potential proportional to the logarithm of the intensity of the radiation incident on said tube, and means for varying the control grid potential of said cathode ray tube in response to variation of said produced potential such that the rate of change of said control grid potential with respect to said produced potential is a constant.

13. Apparatus for automatically controlling the beam current of a radiation-sensitive cathode ray tube under conditions of varying radiation intensity, comprising means for producing a potential which varies logarithmically with said radiation intensity, means for coupling a voltage proportional to said potential to a beam current control element of said tube, means for setting the initial level of the voltage coupled to said control element, and means for setting the rate of change of the voltage coupled to said control element with respect to the change in said produced potential.

14. The apparatus of claim 13, the last-mentioned means comprising means for setting said rate of change without substantially changing said initial level.

15. The apparatus of claim 13, said potential producing means comprising a first impedance across which said potential is produced with respect to a reference level, said coupling means comprising a constant current device in series with a second impedance and a source of potential with respect to said reference level, means connecting a point on said first impedance to a point on said second impedance, a second source of potential connected to said constant current device through an impedance much greater than the total impedance between said constant current device and said reference level, said initial setting means comprising means for deriving a variable bias between said second source and said constant current device, and said rate of change setting means comprising means for varying said points of connection on said first and second impedances simultaneously such that the total potential difference between said constant current device and said reference level remains substantially constant.

16. The apparatus of claim 13, said potential producing means comprising a potentiometer across which said potential is produced with respect to a reference level, said coupling means comprising a pentode connected as a constant current device, the cathode of said pentode being connected to a source of potential with respect to said reference level and the plate of said pentode being connected in series with a variable resistor having a tap connected to the tap of said potentiometer, said rate of change setting means including means for varying said taps such that the potential of said plate remains substantially constant, a second source of potential with respect to said reference level, a second potentiometer connected between said second source and said plate and having an impedance much greater than the impedance between said plate and said reference level through said variable resistor and said first potentiometer, said initial setting means comprising means for deriving a variable bias from said second potentiometer.

17. In a system of the type described, a television camera tube of the electron beam type arranged for exposure to light from a scene to be televised, a cascade video amplifier having its input connected to the output of said camera tube, a photomultiplier tube arranged for exposure to light from said scene, an output impedance coupled to said photomultiplier tube, means for producing a potential across said impedance that varies logarithmically with the intensity of said light, amplifier means for coupling a voltage proportional to said potential to gain control means of said video amplifier, means for coupling a voltage proportional to said potential to beam current control means of said camera tube, a light valve for controlling the intensity of the light incident on said tubes, a motor for controlling said valve, differential amplifier means for controlling said motor, and means for coupling a voltage proportional to said potential to the input of said differential amplifier.

References Cited in the file of this patent

UNITED STATES PATENTS

| | | |
|---|---|---|
| 1,919,182 | Fitzgerald | July 18, 1933 |
| 2,133,882 | Zworykin | Oct. 18, 1938 |
| 2,188,679 | Dovaston | Jan. 30, 1940 |
| 2,402,053 | Keel | June 11, 1946 |
| 2,402,444 | Poch | June 18, 1946 |
| 2,407,485 | Essig | Sept. 10, 1946 |
| 2,421,476 | Belar et al. | June 3, 1947 |
| 2,431,824 | Poch | Dec. 2, 1947 |
| 2,454,169 | Haynes | Nov. 16, 1948 |
| 2,454,871 | Gunderson | Nov. 30, 1948 |
| 2,523,296 | Harris | Sept. 26, 1950 |
| 2,707,238 | Fromm | Apr. 26, 1955 |
| 2,756,364 | Edwards | July 24, 1956 |
| 2,804,550 | Artzt | Aug. 27, 1957 |

FOREIGN PATENTS

| | | |
|---|---|---|
| 607,315 | Great Britain | Aug. 30, 1948 |

UNITED STATES PATENT OFFICE
Certificate of Correction

Patent No. 2,901,539 August 25, 1959

Russell H. Morgan

It is hereby certified that error appears in the printed specification of the above numbered patent requiring correction and that the said Letters Patent should read as corrected below.

Column 2, line 2, for "of", first occurrence, read —to—; line 53, for "sentitive" read —sensitive—; column 4, line 17, the equation should appear as shown below instead of as in the patent—

$$E=-(E_0-a \log cI)$$

line 28, the equation should appear as shown below instead of as in the patent—

$$G=(g_m R_L)^n$$

column 6, line 73, after "control" insert —of—; column 8, line 71, strike out "limited".

Signed and sealed this 8th day of March 1960.

[SEAL]

Attest:

KARL H. AXLINE,
*Attesting Officer.*

ROBERT C. WATSON,
*Commissioner of Patents.*